Figure 1:
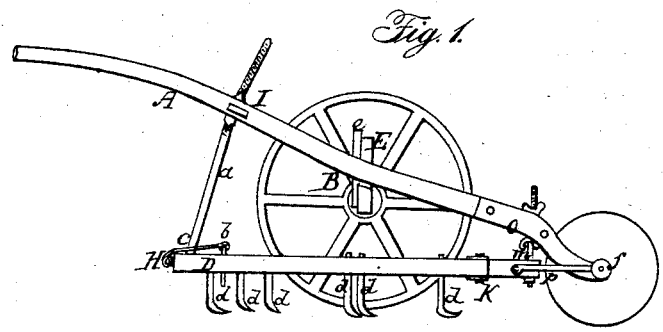
Figure 2:
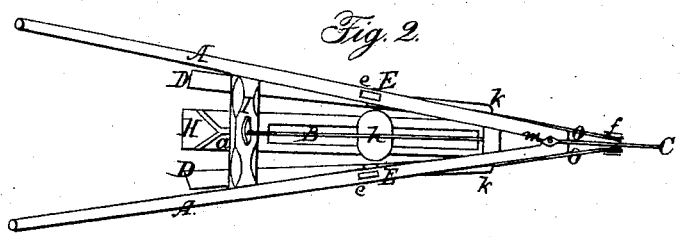
Figure 3:
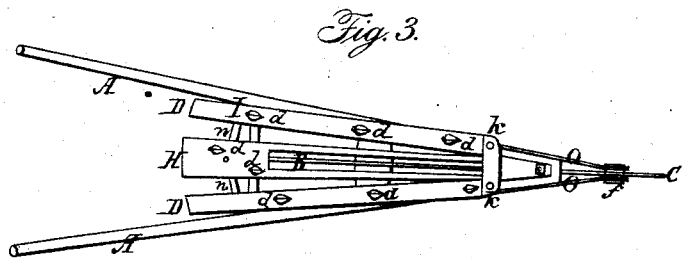
Figure 4:
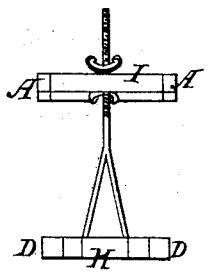

MARSHALL & COBURN.

Cultivator.

No. 955. Patented Oct. 3. 1838.

Witnesses:

Inventor:
Simon M. Marshall
Joseph W. Coburn

UNITED STATES PATENT OFFICE.

SIMEON M. MARSHALL AND JOSEPH W. COBURN, OF DRACUT, MASS.

IMPROVEMENT IN CULTIVATORS AND WEEDERS.

Specification forming part of Letters Patent No. 955, dated October 3, 1838.

*To all whom it may concern:*

Be it known that we, SIMEON M. MARSHALL and JOSEPH W. COBURN, of Dracut, in the county of Middlesex and Commonwealth of Massachusetts, have invented a new and improved mode of eradicating and destroying weeds and breaking and loosening the soil between rows and drills in fields and gardens by a machine which we call the "Weeder;" and we do hereby declare that the following is a full and exact description.

The nature of our invention consists in the construction and use of the machine represented in the accompanying drawing, and described as follows, viz:

A A represent beams passing from near the forward wheel, and terminating in handles, by which the machine is guided or pushed.

B is a large wheel suspended on an axis between the two supports E E, which are inserted in the two beams A A, and fastened by two keys, $l\,l$, and may be raised or depressed at pleasure without altering the height of the beams.

C is a small wheel of about one-half the diameter of the wheel B, and is attached to the beams by two iron shafts, O O, united by the axis $f$, upon which the wheel turns. It is likewise attached to the middle piece, H, by two narrow iron bands, P P.

D D are two side pieces, level with and attached at the fore end to the center piece, H, at K K, and turning on a pivot, and having cross-bars binding the three pieces together.

H is the center piece, to which the beam is fastened by the screws $a\,m$, formed with an opening, through which the wheel B is let down.

$a$ is a screw (more fully represented by the Figure No. 4) fastened to the center piece, H, and passing through the bar I, which unites the two handles A A, and as it is raised or depressed raises or depresses the wheel B, and thus regulates the depth of the cut. $m$ is a screw effecting a similar result, fixed to the center piece at the forward end, and passing through the beams A A at the forward end, where they unite.

$f$ is the axis of the small wheel.

$d\,d\,d$ are teeth, shaped like a double moldboard, but more flattened, of cast iron, made sharp enough to cut the weeds and break the soil with ease, varying in number and size according to the size and use of the machine—say three on each side piece and two in the center piece, $n\,n$. The width of the base or bottom may be varied to suit the width of rows or the convenience of the operators by two shafts, $n\,n$, which, being fixed to each side piece, pass horizontally through the center piece to fasten the side pieces at any convenient width apart.

The size of the machine and weight of its parts will vary with its use, which may be by hand, the operator pushing it before him, or it may be drawn by a horse, the power being attached to the ends of the axis of the small wheel. A convenient size for use by hand is a beam of six feet length, the large wheel two feet in diameter, the small one foot, or fourteen inches, the side pieces about three feet, and the center piece about four feet in length.

What we claim as our improvement, and desire to secure by Letters Patent, is—

The frame in which the wheels work, constructed and operating as above described, in combination with the weeding-harrow, &c., in the manner substantially as herein described.

SIMEON M. MARSHALL.
JOSEPH W. COBURN.

Witnesses:
A. LIVERMORE,
R. B. LAWRENCE.